US007228284B1

(12) United States Patent
Vaillancourt et al.

(10) Patent No.: US 7,228,284 B1
(45) Date of Patent: Jun. 5, 2007

(54) METHOD FOR ROUTING AND RESPONDING TO SALES LEADS BETWEEN TWO ORGANIZATIONS

(75) Inventors: Jane Ellen Vaillancourt, San Jose, CA (US); Katherine Schwertley, Saratoga, CA (US); Rita Jean Welshons, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1015 days.

(21) Appl. No.: 09/894,577

(22) Filed: Jun. 27, 2001

(51) Int. Cl.
*G06F 17/30* (2006.01)
(52) U.S. Cl. ..................................................... 705/10
(58) Field of Classification Search ................ 705/1, 705/9, 26, 37; 715/962
See application file for complete search history.

(56) References Cited

U.S. PATENT DOCUMENTS

| | | | | | |
|---|---|---|---|---|---|
| 5,930,764 | A | * | 7/1999 | Melchione et al. | 705/10 |
| 5,978,836 | A | * | 11/1999 | Ouchi | 709/206 |
| 6,067,525 | A | * | 5/2000 | Johnson et al. | 705/10 |
| 6,078,892 | A | * | 6/2000 | Anderson et al. | 705/10 |
| 6,327,611 | B1 | * | 12/2001 | Everingham | 709/206 |
| 6,662,164 | B1 | * | 12/2003 | Koppelman et al. | 705/14 |
| 6,721,611 | B2 | * | 4/2004 | Schneider et al. | 700/84 |
| 6,760,727 | B1 | * | 7/2004 | Schroeder et al. | 707/1 |
| 6,850,895 | B2 | * | 2/2005 | Brodersen et al. | 705/9 |
| 6,868,389 | B1 | * | 3/2005 | Wilkins et al. | 705/10 |
| 7,035,699 | B1 | * | 4/2006 | Anderson et al. | 700/90 |
| 7,047,206 | B1 | * | 5/2006 | Schultze | 705/10 |
| 2001/0047289 | A1 | * | 11/2001 | Mckee et al. | 705/9 |
| 2002/0026356 | A1 | * | 2/2002 | Bergh et al. | 705/14 |
| 2002/0035504 | A1 | * | 3/2002 | Dver et al. | 705/10 |
| 2002/0059095 | A1 | * | 5/2002 | Cook | 705/10 |
| 2002/0077998 | A1 | * | 6/2002 | Andrews et al. | 707/1 |
| 2002/0082892 | A1 | * | 6/2002 | Raffel et al. | 705/8 |
| 2006/0064340 | A1 | * | 3/2006 | Cook | 705/10 |

FOREIGN PATENT DOCUMENTS

WO    WO 98/49641    * 11/1998

OTHER PUBLICATIONS

UpShot.com—Help Manual/Files Jul. 21, 1998.*
UpShot.com—Quick Reference Guide Feb. 2001, Retrieved from Archive.org Aug. 29, 2005.*
UpShot—Data Sheet—UpShot Online service Feb. 2001, Retrieved from Archive.org Aug. 29, 2005.*

(Continued)

*Primary Examiner*—Tariq R. Hafiz
*Assistant Examiner*—Scott L. Jarrett
(74) *Attorney, Agent, or Firm*—W. Eric Webostad

(57) ABSTRACT

Apparatus, method and system network for lead processing are described. More particularly, a web-based client-server system is described where a sales force automation system is used for updating databases and routing tasks based on user activity. In particular, action item form screen images and lead form screen images may be cast as objects and associated with one another. A lead source is identified with a lead, and activity with respect to whether such a lead results in a registration or a quote is tracked. Moreover, whether such registration or quote results in actual revenue generation is tracked as based on an existing opportunity or a new opportunity. Accordingly, lead source effectiveness for generating new business may be determined based on revenue generation.

8 Claims, 12 Drawing Sheets

OTHER PUBLICATIONS

Rupley, Sebastian, Customer Care on Wall Street Jun. 27, 2000, PC Magazine.*
Goldberg, Barton, The Marketing Automation Explosion DestinationCRM.com, Jan. 1, 2000.*
Goldberg, Barton, Taking Acount DestinationCRM.com, Jan. 1, 2000.*
Goldberg, Barton, Managing the Sales Force, DestinationCRM.com, Jan. 1, 2000.*
Dickie, Jim, CRM for the Little Guy: What's In It for Me? DestinationCRM.com, Jul. 19, 2000.*
Alwang, Greg et al., PC Magazine Reviews—UpShot.com PC Magazine, Sep. 19, 2000.*
Alwang, Greg, Sell Smarter PC Magazine Australia, Nov. 2000.*
Dance, Richard et al., Managing sales and customers Management Accounting, May 1998, vol. 79, No. 11.*
Clarify Redefines Customer Relations Management with Introduction of eFrontOffice Mar. 18, 1999, PR News Wire.*
Clarify does e-commerce FrontOffice Unix & NT News, Apr. 1999.*
Sarkar, Christian, Building Profitable Relationships: CRM TOols One World, Sep. 1999.*
Clarify Unveils Next Generation eFrontOffice Application for Sales PR Newswire, Sep. 1, 1999.*
Goldenberg, Barton, Telesales/Telemarking Gets A Face-Lift Destination CRM, Jan. 1, 2000.*
Record-Breaking Enterprise Scalability with Clarifying FrontOffice Clarify, 1999.*
Clarify Architecture—A Technology Overview Clarify, 2000.*
Siebel Systems, Inc., Field Sales Applications TechRepublic.com, 2001.*
Sales Force Automation Component Overview Salesforce.com, 2001.*
Friedman, Lawrence G. et al., The Channel Advantage Butterworth-Heinemann, 1999, ISBN: 0750640987.*
LeadMaster.Com Web Pages Jul. 2000-Apr. 2001, Retrieved from Archive.org Jan. 19, 2006.*
Pivotal.com Web Pages Mar.-Aug. 2000, Retrieved From Archive.org Jan. 19, 2006.*
SalesLogix.com Web Pages Apr. 2001, Retrieved from Archive.org Aug. 30, 2005.*
Onyx.com Web Pages 1999-2000 Retrieved from Archive.org Jan. 18, 2006.*
Salesforce.com Web Pages Feb. 2001, Retrieved from Archive.org Jan. 18, 2006.*
Bergh et al., Customer Lead Management System U.S. Appl. No. 09/575,283, filed May, 22, 2000, Incorporated by reference Bergh et al., U.S. Patent Pub. 2002/0026356.*
Taylor, Thayer, Giving Sales Leads a Leading Edge S&MM Sales & Marketing Management, vol. 127, No. 4, Sep. 1981, Abstract.*
Blue, Karen, Closing the Loop: Hewlett-Packard's New Lead Management System Business Marketing, vol. 72, No. 10, Oct. 1987, Abstract.*
Erschik, Richard, Sales Leads Can Truly Be Seeds of Sales The Journal of Business & Industrial Marketing, vol. 4, No. 2, Summer/Fall 1989, pp. 27-31.*
Stein, Tom, Closer to Customers—Suites integrate help desk, sales and support apps in a single package InformationWeek, May 12, 1997.*
Griggs, Robyn, Give us leads! Give us leads! Sales and Marketing Management, vol. 149, No. 7, Jul. 1997, pp. 66-72.*
ChannelWave Introduces Release 2.0 of Partner Relationship Management Software Buesiness Wire, Jan. 25, 1999.*
MarketSoft Launches First Web-Based Lead Management Solution, Fixing a Fundamentally Broken Process PR Newswire, May 24, 1999.*
Kay, Alan, Smooth Sailing in the Channel CIO, Jun. 15, 1999.*
Goldenberg, Barton, The Marketing Automation Explosion DestinationCRM.com, Jan. 1, 2000.*
Hakala, David, Answering The Sales Call Sm@rt Reseller, vol. 3, No. 3, Jan. 24, 2000.*
Pivotal Selects MarketSoft's Lead Management Solution PR Newswire, May 1, 2000.*
Front Line Solutions Releases ePartner2000 Best Practices Report Business Wire, May 9, 2000.*
Fraone, Gina, Keeping partners together—Suppliers tap RPM to boost channels eWeek, Apr. 9, 2001.*
MarketSoft.com Web Pages Feb.-Mar. 2000, Retrieved from Archive.org Jun. 22, 2006.*
ChannelWave.com Web Pages May 2000, Retrieved from Archive.org Jun. 21, 2006.*
Hennessey, Hubert, Software Propels the Selling Cycle Software Magazine, Jun. 1988, vol. 8, No. 9, pp. 57-64.*
Collins, Robert, Mastering Inquiries And Sales Leads The Journal of Personal Selling & Sales Management, Summer 1989, vol. 9, No. 2, pp. 73-75.*
Griggs, Robyn, Taking the leads Sales and Marketing Management, Sep. 1995, vol. 147, No. 9.*
Lamoms, Bon, Be samrt: Offer inquiry qualification services Marketing News, Nov. 6, 1995, vol. 29, No. 23, p. 13.*
Siebel, Thomas et al., Virtual Selling: An Introduction Siegel Magazine, vol. 1, No. 1. pp. 20-23.*
Friedman, Lawrence et al., The Channel Advantage Butterworth Heinemann, 1999, ISBN: 0-7506-4098-7.*
Rolnicki, Kenneth, Managing Channels of Distribution: The Marketing Executive's Complete Guide American Management Association, 1998, ISB: 0-8144-0335-2.*
Novick, Harold, Selling Through Independent Reps Third Edition American Management Association, 2000, ISBN: 0-8144-0522-3.*

* cited by examiner

METHOD FOR ROUTING AND RESPONDING TO SALES LEADS BETWEEN TWO ORGANIZATIONS

FIELD OF THE INVENTION

The present invention generally relates to lead processing, and more particularly to an object-oriented computer system for associating a lead source with revenue generation.

BACKGROUND OF THE INVENTION

Sales activity often involves following-up leads. These leads may originate from trade shows, promotions, advertising or business acquaintances and the like. Conventionally, lead inquires are collected through various sources, and then they are sent out for qualification or directly sent for qualification to one or more qualification firms. These qualification firms record and qualify the lead inquiries and e-mail qualified leads to a literature coordinator at a sales office. The literature coordinator distributes the qualified leads to field sales personnel or an appropriate distributor within an applicable territory.

Accordingly, it would be desirable to provide a solution that automates and streamlines distribution of field ready qualified leads and provides a comprehensive campaign management tool that will provide return on investment data.

SUMMARY OF THE INVENTION

The present invention generally relates to apparatus, method and system network for processing a lead. More particularly, a programmed computer system is provided having a display and coupled to a network, a cursor-pointing device and a keyboard. The network may be a private network, a virtually private network or a portion of the Internet. The programmed computer system may be a web-enabled client computer system. In communication with the programmed computer system is a web-enabled programmed server computer system, which is programmed in part with a sales force automation system. This provides for web-based client-server activity, as follows.

An action item form screen image is displayed on the display, where the action item form screen image has a display lead button and a dispatch button. The display lead button may be selected to provide a lead form screen image on the display in response to the display lead button selected, where the lead form screen image has an opportunity field. An entry may be made into the opportunity field, upon which one may return to the action item form screen image. With the action item for screen image displayed, the dispatch button may be selected to provide a dispatch form screen image in response to the dispatch button selected. The dispatch from screen image may be used to dispatch an action item object corresponding to the action item form screen image to another programmed computer system.

After receiving such an action item object, a lead form screen image may be obtained from the action item object. The lead form screen image has a create quote button for creating a quote in part by selecting the create quote button. Once created a quote may be sent to a programmed computer system. After receiving such a quote, the lead form screen image may be obtained from the quote, and it may be determined whether the quote represents an existing opportunity. Status of a lead may be updated in response to determining whether the quote represents an existing opportunity or a new opportunity. As communication is done through a web-enabled programmed server computer system, databases associated with the sales force automation system are automatically updated and traffic is automatically routed. With an automatic accumulation of data for a database based on user activity, it may be determined how much revenue was generated by a lead source associated with the lead to quantify effectiveness of the lead source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4A is a screen image of an exemplary embodiment of a lead action item form screen image in accordance with an aspect of the present invention.

FIG. 4C is a screen image of an exemplary embodiment of a design registration form screen image having a detail tab selected to provide a design registration detail view in accordance with an aspect of the present invention.

FIG. 4D is a screen image of an exemplary embodiment of a quote form screen image having a header tab selected to provide a quote detail view.

DETAILED DESCRIPTION OF THE DRAWINGS

While foregoing is directed to the preferred embodiment of the present invention, other and further embodiments of the invention may be devised without departing from the basic scope thereof, and the scope thereof is determined by the claims that follow.

Figure 1:
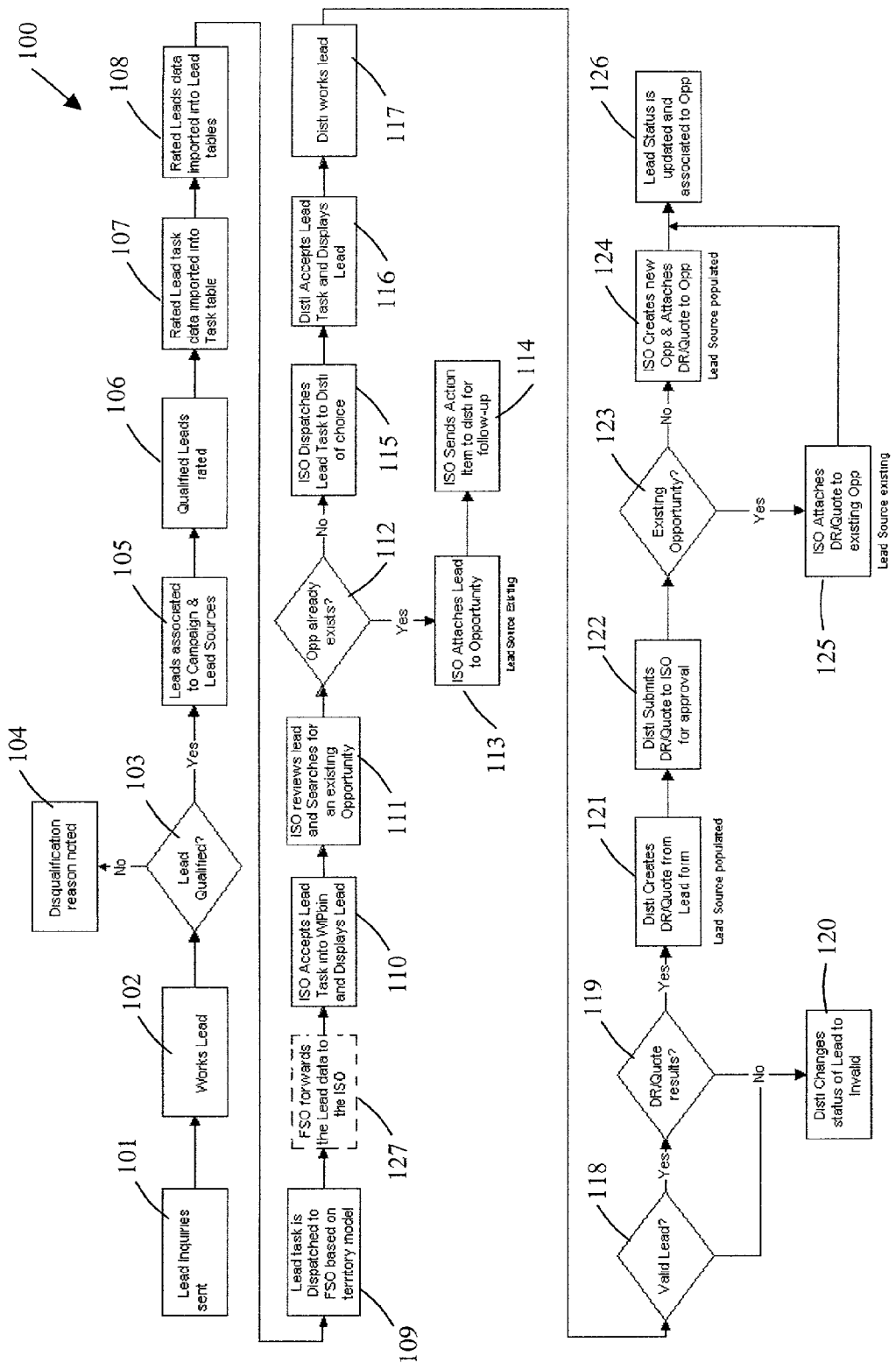
FIG. 1 is a flow diagram of an exemplary embodiment of a lead process in accordance with an aspect of the present invention.

Referring to FIG. 1, there is shown a flow diagram of an exemplary embodiment of lead process 100 in accordance with an aspect of the present invention. Lead process 100 describes how leads are qualified and disseminated to field representatives after lead inquires are received at step 101. Lead status is systematically updated based on how a lead is acted upon. This systematic processing facilitates corporations to know what percentage of leads are followed up on by field representatives, what percentage of leads result in business and like information.

At step 101, lead inquiries are passed from any of a plurality of data sources for lead qualification to a lead data gathering organization. A company may be hired to receive such leads, as a lead qualification agency, for passing on to the hiring company to which such leads are ultimately to be directed. At step 102, each lead inquiry is analyzed for purposes of completeness and qualification. For purposes of clarity of explanation, the remainder of FIG. 1 is described in terms of processing a single lead though multiple leads may be process simultaneously.

At step 103, it is determined if a lead is qualified. If a lead is not qualified at step 103, the reason(s) for non-qualification are noted at step 104. If a lead is qualified, then at step 105 such a lead inquiry or lead is associated with a lead source and a campaign from lists of valid lead sources and campaign names, which may be provided from a marketing department. At step 106, such qualified lead is rated. Examples of such ratings are AAA, AA, A or B leads. Another company hired to receive such leads may enter rating information prior to passing such a qualified lead to a hiring company, or rating information may be collected and entered directly by the hiring company.

At step 107, qualified, rated lead data for the lead is imported into a lead information database in communication with or having an association with a sales force automation system. This database may comprise an action item table and lead tables. At step 107, lead follow-up activity information is loaded into such action item table. At step 108, rated lead data is imported into such lead tables. Associated lead contact and product interest information is loaded into such lead tables.

At step 109, a lead task is dispatched to a sales organization lead queue, such as an Independent Sales Organization (ISO), a Field Sales Organization (FSO), or one or more other representatives. Dispatching may be done based on an existing territory model. Optionally, a step 127 may be used where an FSO forwards lead data to an ISO for receipt at step 110. At step 110, an ISO, FSO or other representative accepts such a lead task into a work-in-progress bin (WIP-bin). A representative may display lead data by clicking on a web page or other computer screen display button for a lead action item form. For purposes of clarity of explanation, it is assumed that the representative is an ISO for the remainder of description of FIG. 1 though other representatives may be used. At step 111, an ISO retrieves lead information and searches for an existing opportunity. For example, an ISO may search for an existing opportunity if it is believed that an opportunity within a sales force automation system already exists.

At step 112, it is determined whether an opportunity already exists. If an opportunity already exists, at step 113 an ISO attaches a lead being worked to such an existing opportunity by selecting such existing opportunity into an lead action item form for the lead. Because there is an existing opportunity, a lead source associated with the lead being worked already exists in the database.

At step 114, an ISO sends such lead action item form to a lead-associated distributor for follow-up. Such a distributor may already be associated with such leads based on type, location, among other classifications and the like. However, if an opportunity does not already exist or is not found at step 113, then an ISO dispatches a lead action item form to a distributor of choice. Such a distributor may be selected based on lead type, location, among other classifications.

At step 116, a distributor accepts a lead action item associated with a lead action item form received. A distributor may display lead data by clicking on a web page button or other computer screen display button for a lead action item form. At step 117, a distributor works the lead. At step 118, the distributor determines if the lead is a valid. If a lead turns out to be invalid, a distributor working such a lead updates its status to invalid at step 120.

At step 119, it is determined if a registration or a quote results from a lead. If a registration or a quote results from a worked lead form, a distributor creates a registration or quote object from such a lead form at step 121; otherwise, a distributor working such a lead updates its status to invalid at step 120. To create such an object, a distributor may click on a create registration or quote button, as applicable, and in response thereto a new registration or quote form, as applicable, will appear. After completing data fields within a registration or quote form, the distributor may supply new customer or contact information within a database if needed.

At step 122, a distributor submits a registration or quote form to an ISO for approval. At step 123, another check is done to determine whether an existing opportunity is present. This second check is done to determine whether an opportunity was created by another lead associated with the same lead source as a lead being processed between the time of the check at step 112 and this check at step 123. If there is no existing opportunity after a search by an ISO at step 123, then the ISO creates a new opportunity from the submitted registration or quote form and attaches it to the newly created opportunity at step 124, which automatically causes a lead source associated with the lead being worked to be populated in a lead source database. If, however, there is an existing opportunity at step 123, at step 125 an ISO attaches the submitted registration or quote form to such an existing opportunity. In other words, a lead source associated with the lead being worked already exists in the lead source database.

At step 126, lead status is updated and associated to such an opportunity. Accordingly, lead status is associated with a lead source which created a new opportunity or which is associated with an existing opportunity.

Figure 2:
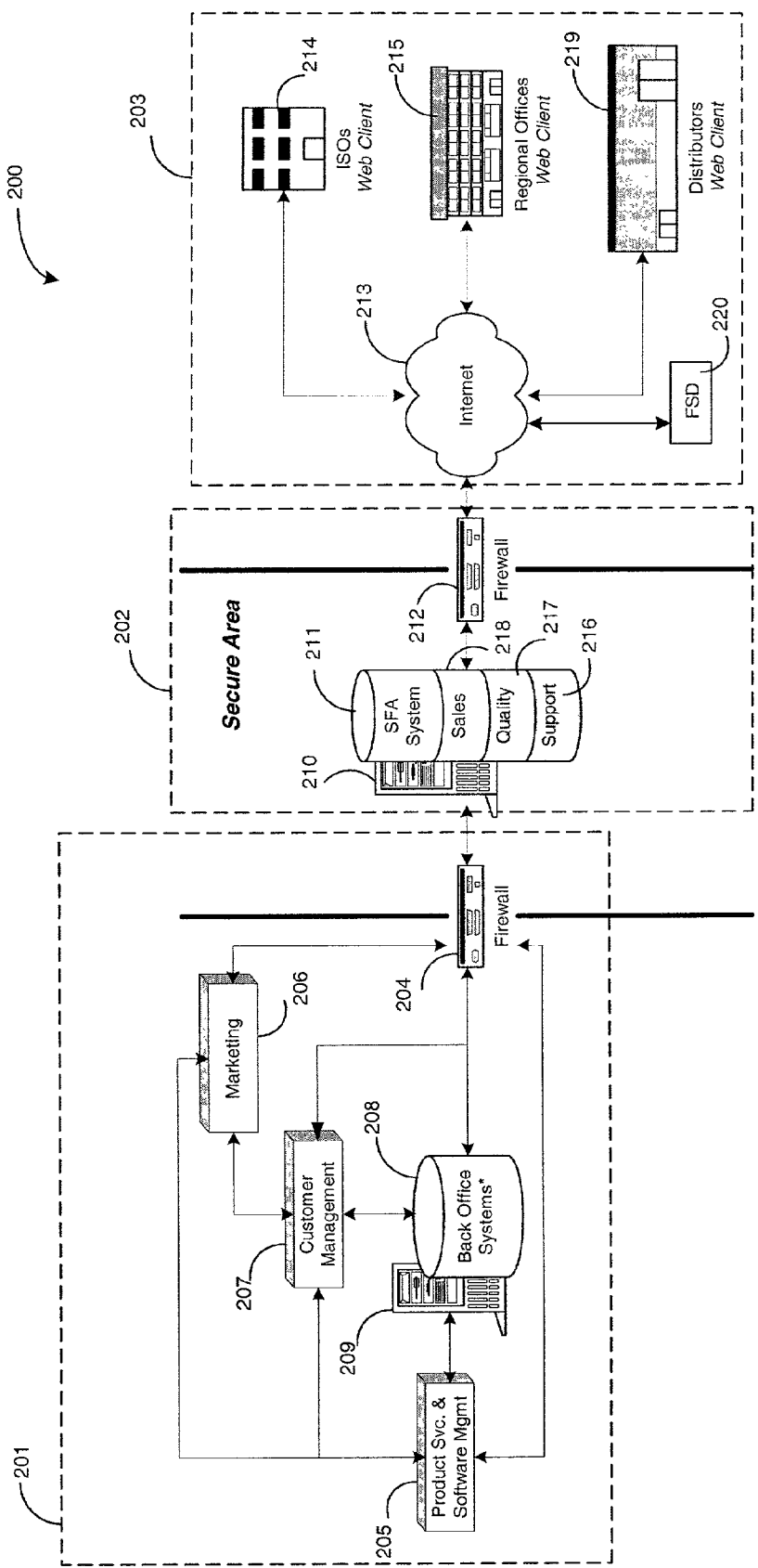
FIG. 2 is a system level diagram of an exemplary portion of an embodiment of a data processing network in accordance with an aspect of the present invention.

Referring to FIG. 2, there is shown a system level diagram of an exemplary portion of an embodiment of data processing network 200 in accordance with an aspect of the present invention. Data processing network 200 comprises corporate management subnetwork 201, automated sales subnetwork 202 and distribution subnetwork 203. Corporate management subnetwork 201 comprises computer 209 comprising back office systems 208, operatively coupled to product services and software management system 205, customer management system 207 and optionally firewall network server 204, which are operatively coupled to marketing system 206. Back office systems 208 may comprise information associated with lead process 100. By way of example, back office systems 208 may comprise a database or databases for lead sources, campaign names, distributors, ISO's, FSOs, regional offices and other information associated with lead process 100.

Corporate management subnetwork 201 may be put in communication with automated sales subnetwork 202 through firewall network server 204. Automated sales subnetwork 202 comprises computer 210, comprising sales force automation (SFA) system 211, sales database 218, quality database 217 and support database 216, and optionally firewall network server 212. SFA system 211 provides a Web server side for accessing lead data, receiving updated lead data, processing lead data and automatically directing actions to be taken associated with lead data, among other activities described elsewhere herein. Upon receipt of data, SFA system 211 determines delivery location based on origin, type and content of received data, then automatically routes transmission(s) associated with such data to an appropriate resource or system.

Automated sales subnetwork 202 may be put in communication with distribution subnetwork 203 through network server firewall 212 and some portion of the Internet 213. Distribution subnetwork 203 is in communication with some portion of the Internet 213 for networking ISOs 214, regional offices 215, FSOs 220 and distributors 219 among other Web clients with automated sales subnetwork 202.

It should be understood that network 200 is described at a high-level depicting interfaces in locations of systems constituting a portion of an infrastructure. Accordingly, many known details have been omitted in order to avoid unnecessarily obscuring the present invention.

Now, with an understanding of lead process 100 and data processing network 200, more detail regarding implementation of such process is provided. Many of these additional details are described in terms of screen images; however, it will be understood by those of skill in the art of the present invention that such screen images are graphical user interface (GUI) representations of data input and display screens having fields for database organization and input. Such screen images are representations of objects that may be manipulated for purpose of organization, association, storage and communication. Such screen images may comprise selectable commands for creating associations of one such object to one or more other objects.

Figure 3:
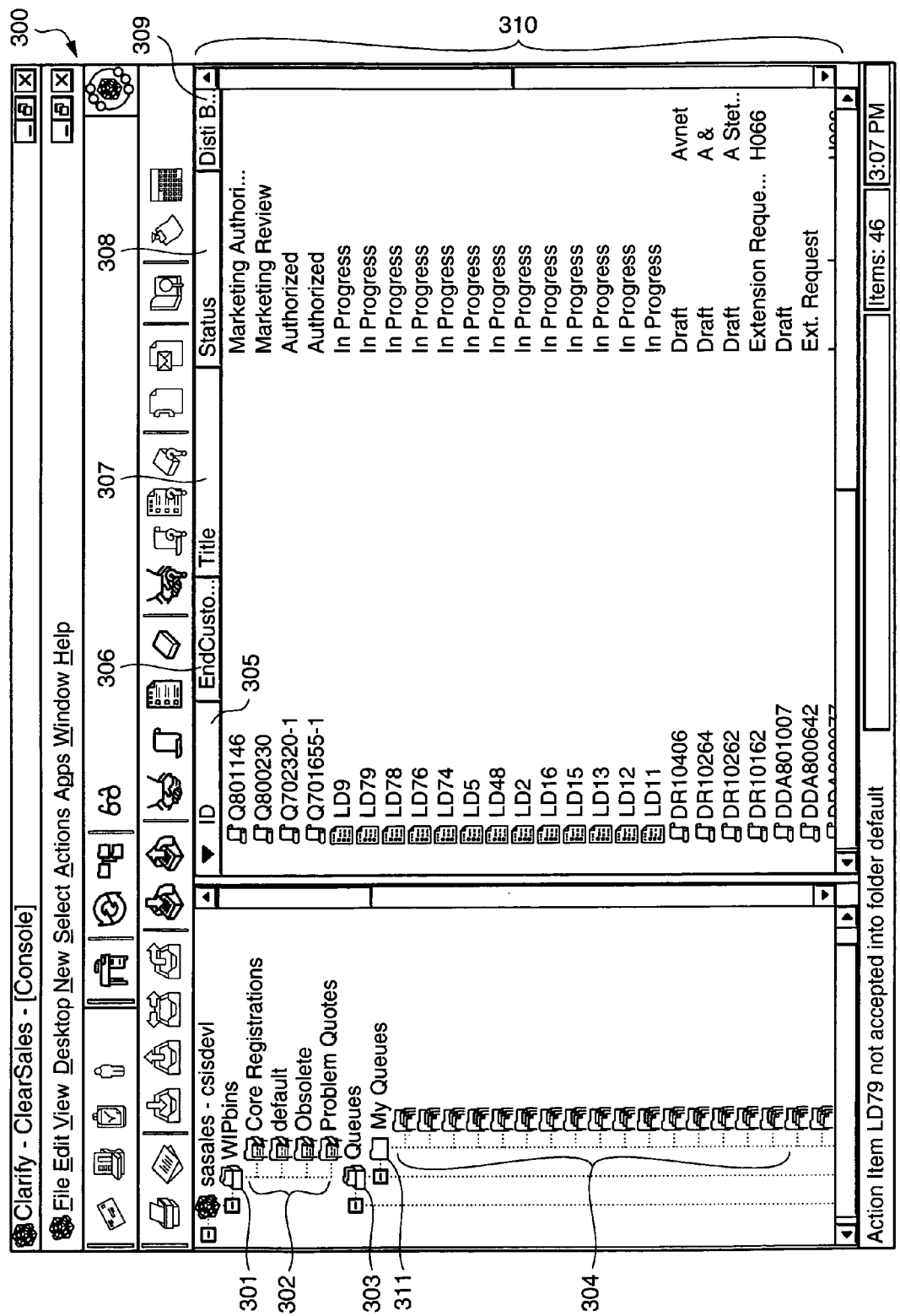
FIG. 3 is a screen image of an exemplary embodiment of a lead action item console image in accordance with an aspect of the present invention.

Referring to FIG. 3, there is shown a screen image of an exemplary embodiment of a lead action item console screen image 300 in accordance with an aspect of the present invention. Console screen image 300 lists WIPbins folder 301, queues folder 303 and action item leads 310. A plurality of subfolders 302 and 311 may be used for additional groupings with respect to folder's 301 and 303, respectively. Files 304 are for ISO, FSO or other representative queued leads. Such files 304 may be attached to lead action items 310. Attaching a lead to a lead action item facilitates dispatching it within SFA system 211, as a lead is not a workflow object. Accordingly, by opening lead action item 304, a lead 310 attached to such action item 304 may be determined. To work on a lead 304, it may be dragged and dropped into WIPbin 301 for obtaining ownership or responsibility to work or have another work such a lead.

Lead action items 310 comprise identification 305, an end customer 306, a title 307, a status 308 and a distributor 309. Data for these headings may be located in respective data fields as will become more apparent. Title 307 of a lead action item indicates a lead identification number 305 followed by the name of a site or end customer associated with such a lead. A lead identification number 305 begins with "LD" followed by a system-generated number. Using system-generated numbers provides at least an approximately chronological ordering of leads as numbers are sequentially assigned. However, leads may be grouped and provided for lead identification every three months.

Figure 4A:
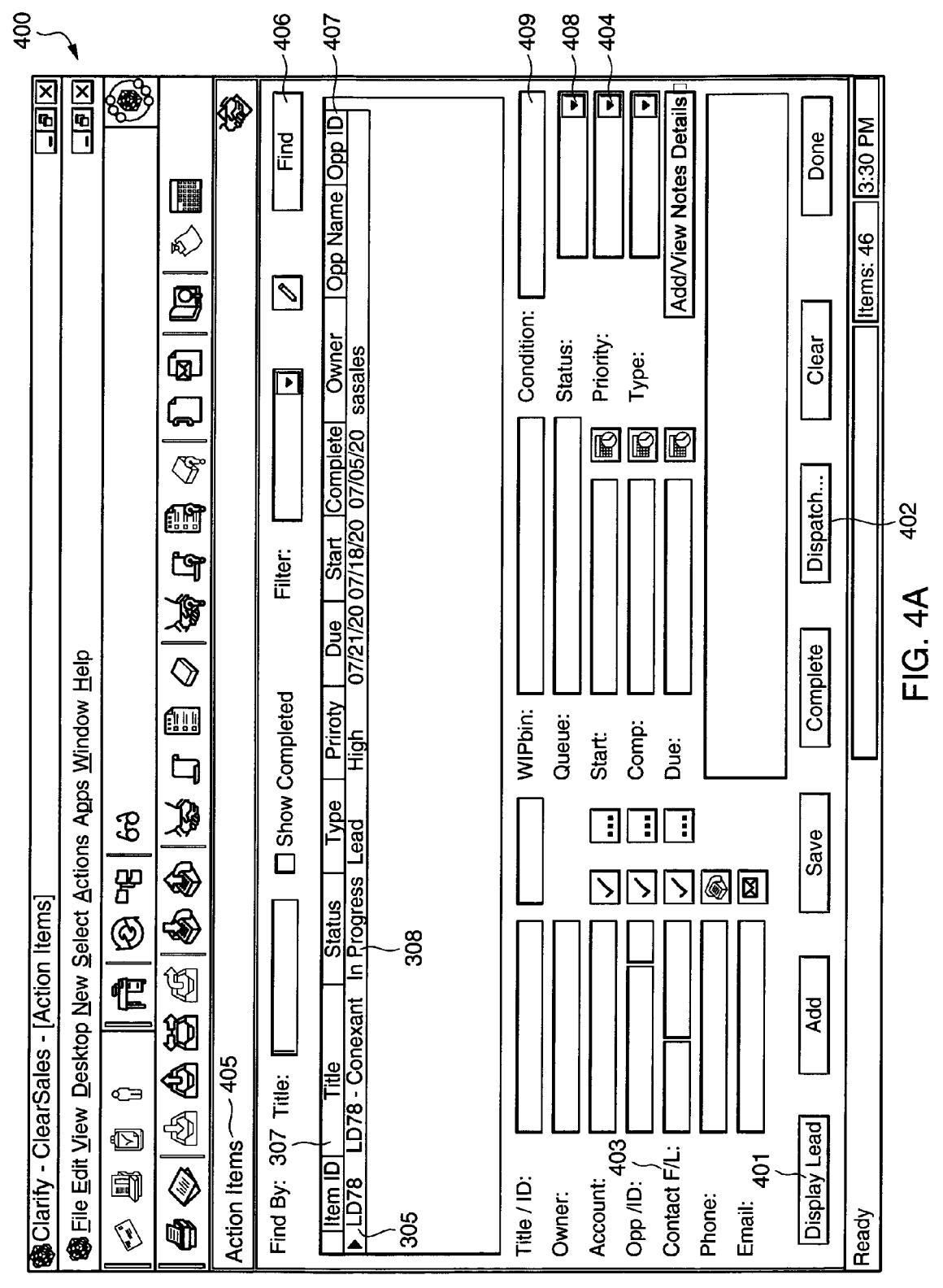

Referring to FIG. 4A, there is shown a screen image of an exemplary embodiment of a lead action item form screen image 400 in accordance with an aspect of the present invention. Lead action item form screen image 400 comprises display lead button 401 and dispatch button 402. At which point, a representative can obtain data regarding such a lead by clicking display lead button 401, accept such a lead and dispatch such a lead to a distributor.

Dispatch button allows an ISO, FSO or other representative to forward a lead to a distributor of choice. Leads are transmitted using a lead action item object and have a priority indicated in priority field 404. Notably, for convenience a find by title field 405 and filter field 406 are part of lead action item form screen image 400, and thus by clicking on find button 407 a user may search for lead action items without having to pull down or otherwise actuate any other menu.

Condition field 409 is to note state of a lead action item, for example opened or closed. Status field 408 is to note status of a lead, for example authorized, pending marketing review, in progress, draft or extension requested. Contact field 403 is to indicate a first and last name (F/L) for a person to contact regarding such lead, such as an employee of a current or potential customer.

Figure 4B:
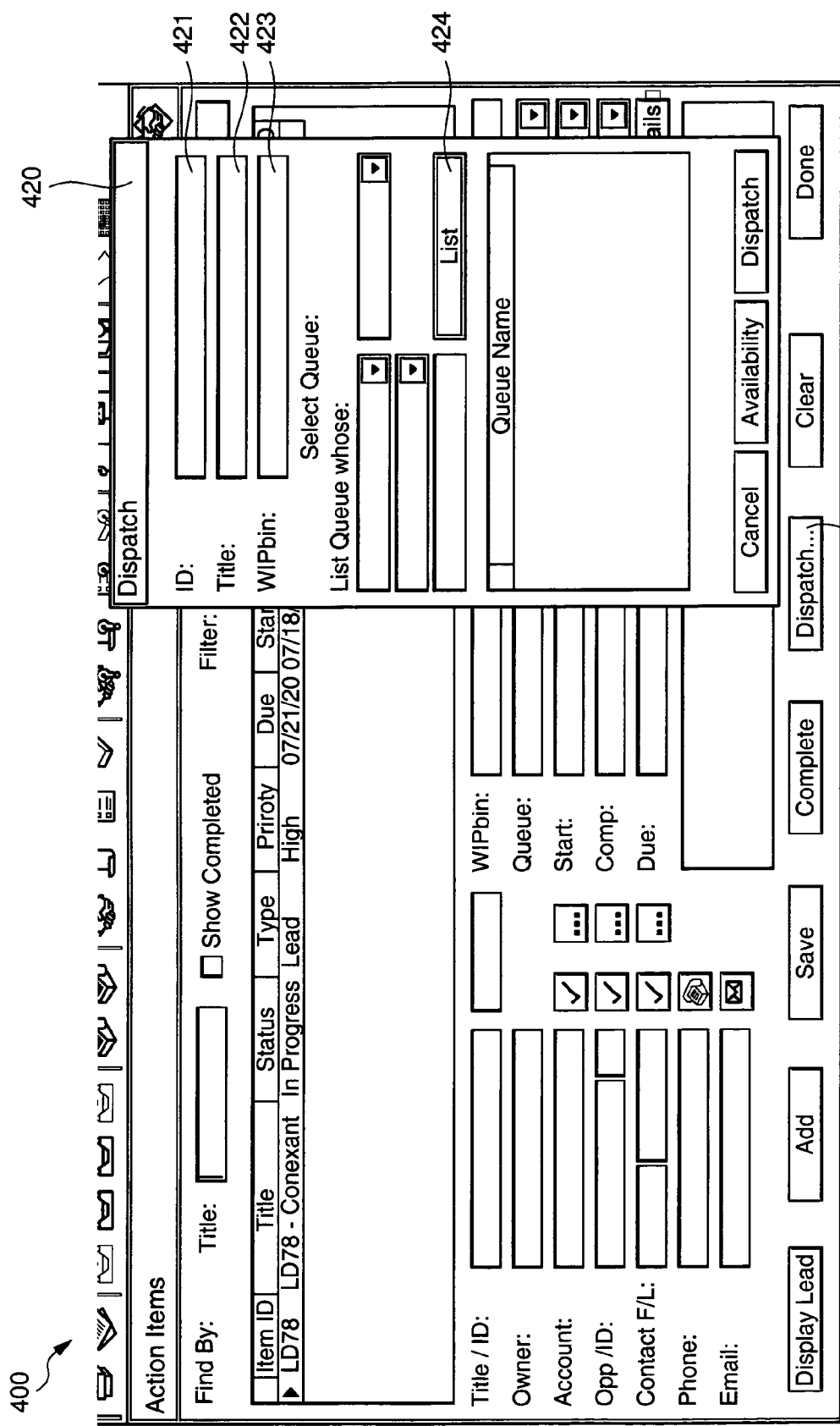
FIG. 4B is a screen image of an exemplary embodiment of a lead action item form screen image and a dispatch form screen image in accordance with an aspect of the present invention.

Referring to FIG. 4B, there is shown a screen image of an exemplary embodiment of a lead action item form screen image 400 and a dispatch screen image 420 in accordance with an aspect of the present invention. Dispatch screen image 420 is activated in response to selecting dispatch button 402.

Dispatch screen image comprises lead identification field 421, lead title field 422 and WIPbin field 423. As there may be a plurality of distributors to which a sales representative may dispatch a lead, list button 424 is provided to list distributors within a territory associated with such a lead. Accordingly, a distributor receiving such a dispatched lead may invalidate it, create a design registration (DR) from it or create a quote from it. If a distributor creates a quote or a design registration, a lead source associated with such quote or design registration is automatically stored.

Figure 4C:
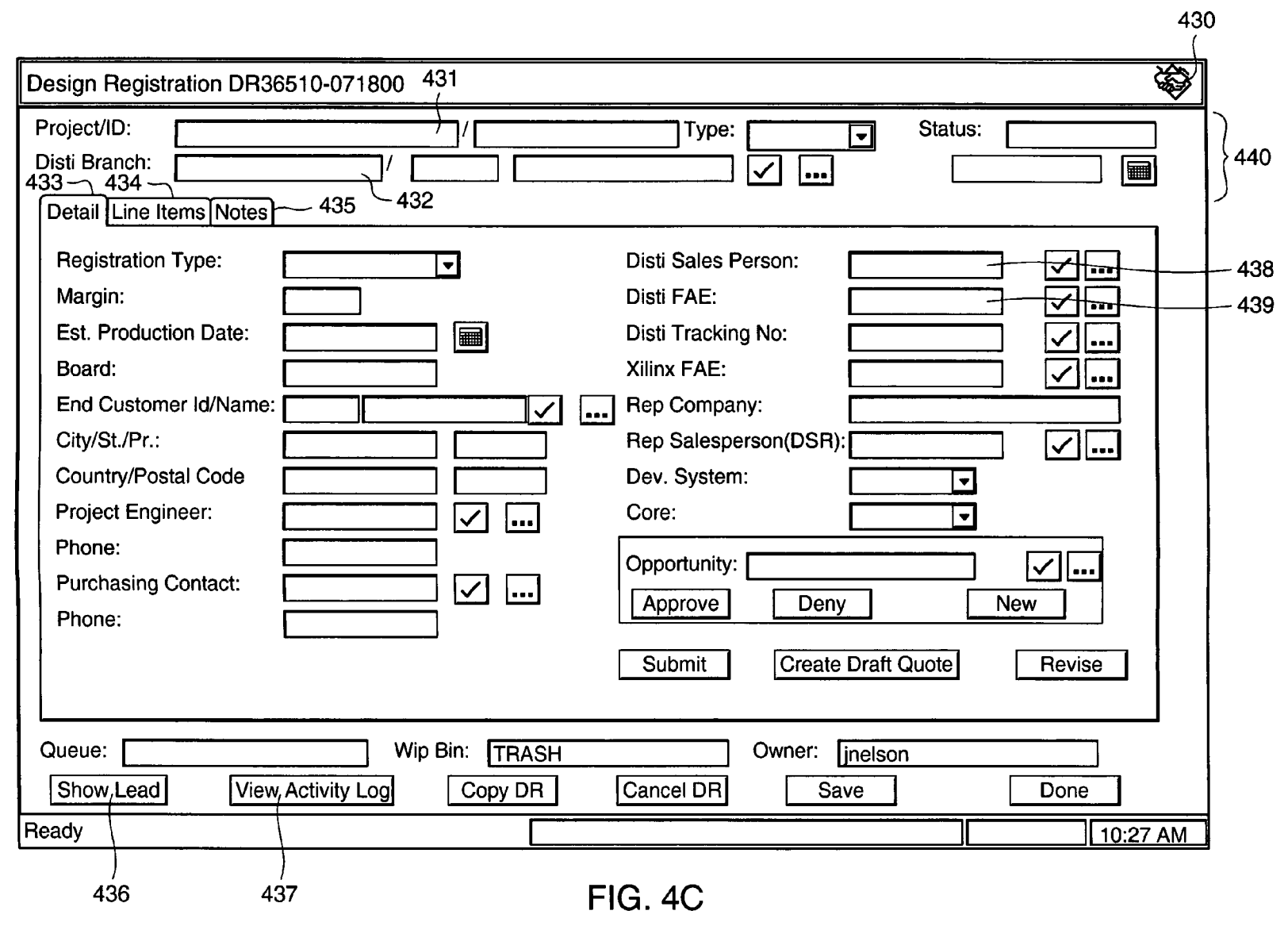

Part of this description is in terms of preparing a design in response to a customer; however, such registration may be omitted in business cases where it is inapplicable. However, in FIG. 4C there is shown a screen image of an exemplary embodiment of a design registration form screen image 430 having a detail tab 433 selected to provide a design registration detail view in accordance with an aspect of the present invention. Design registration form screen image 430 comprises a header section 440 and three selectable tabs, namely detail tab 433, line items tab 434 and notes tab 435. Header section 440 comprises project identification field 431 and distributor branch field 432. Detail tab 433 comprises distribution sales person field 438 and distribution field application engineer (FAE) field 439. Design registration form screen image 430 further comprises show lead button 436 to go to a lead object screen image and view activity log button 437 to go to an activity log regarding a lead associated with such design registration.

Figure 4D:
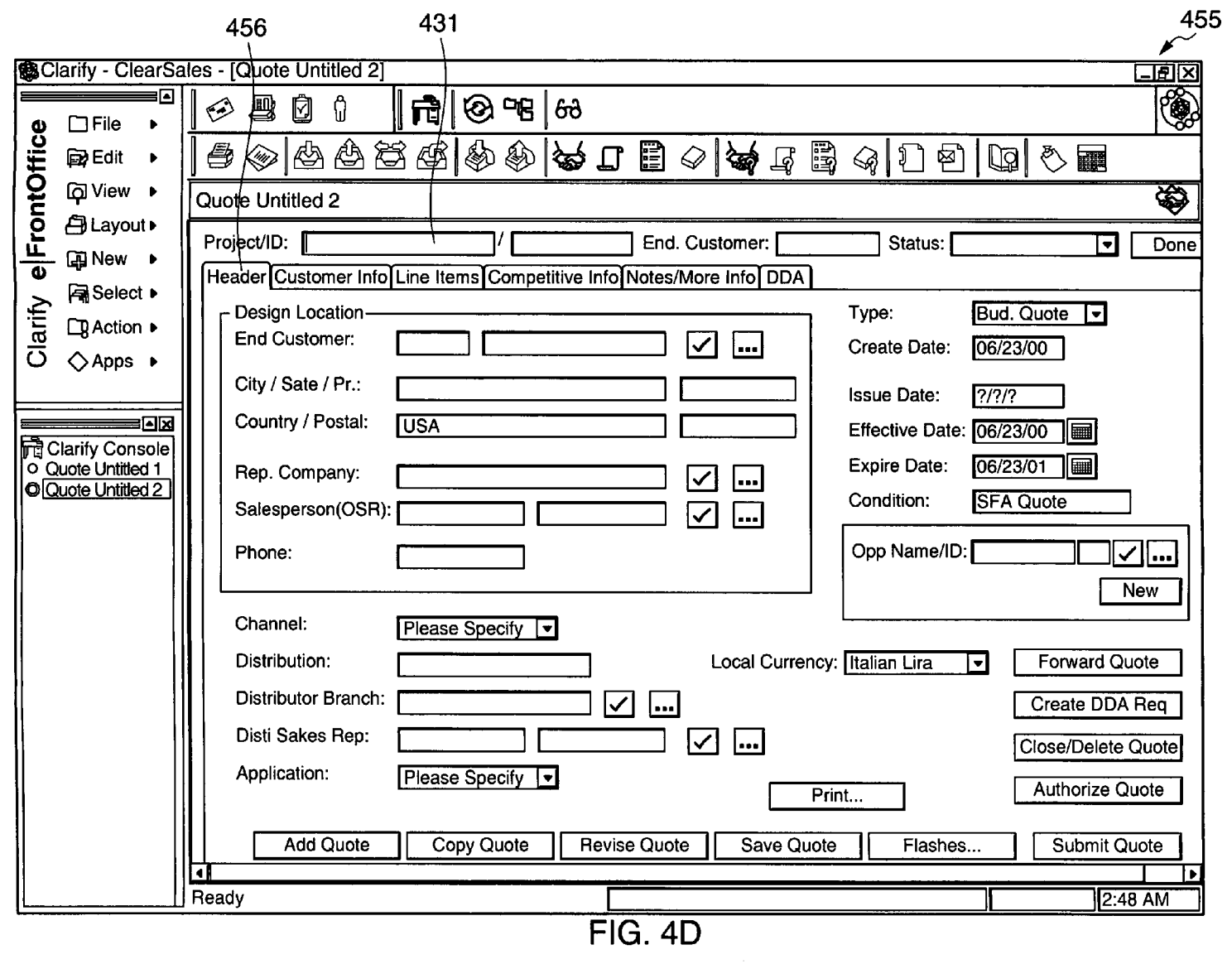

Referring to FIG. 4D, there is shown a screen image of an exemplary embodiment of a quote form screen image 455 in accordance with an aspect of the present invention. Quote form screen image 455 is shown with header tab 456 fields displayed. Quote form screen image 455 comprises project identification field 431.

Figure 5A:
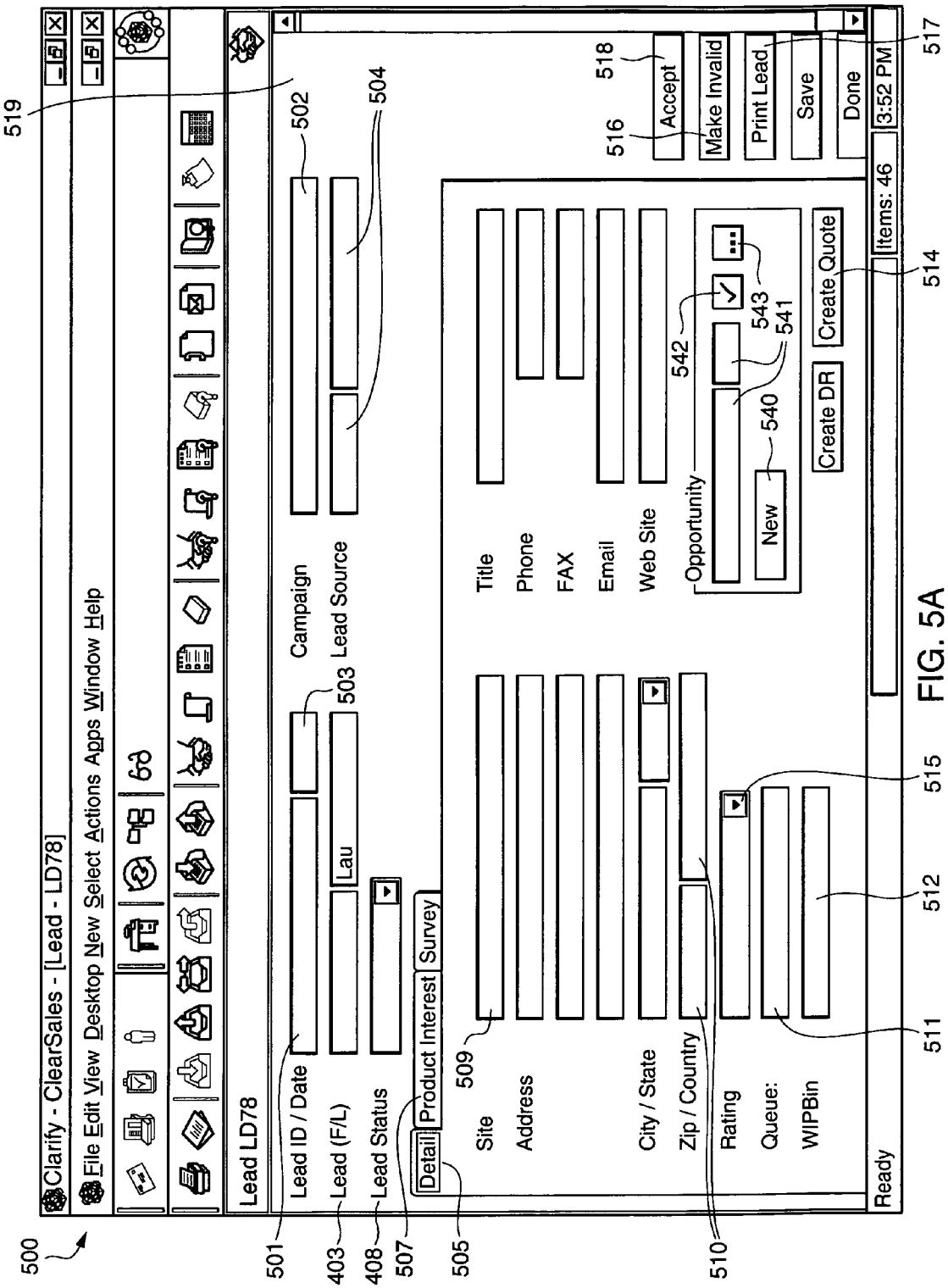
FIG. 5A is a screen image of an exemplary embodiment of a lead form screen image for a lead having detail tab selected to provide a lead detail view in accordance with an aspect of the present invention.

Referring to FIG. 5A, there is shown a screen image of an exemplary embodiment of a lead form screen image 500 for a lead having detail tab 505 selected to provide a lead detail view in accordance with an aspect of the present invention. As mentioned elsewhere herein, a lead object comprises a header section 519 and three tabs, as indicated by reference numbers 505–507. Lead identification field 501 comprises "LD" followed by a unique lead identifier number. Date field 503 is a date assigned by SFA system 211 shown in FIG. 2, namely, a date such lead was captured by SFA system 211. Campaign field 502 is for a marketing effort associated with such a lead, and may further be associated to at least one offered product or product division. Lead source fields 504 provide a sub-level under campaign and refer to marketing activity generating such a lead. Examples of lead sources are specific ads, tradeshows, promotions and the like. By tracking leads by campaign and lead source, success of marketing efforts may be measured as viewed by the number and value of opportunities generated by such efforts, which additionally may be compared to cost of such campaign and lead source for a return on investment analysis.

Detail tab 505 provides a site field 509 to indicate a customer or other site name. Leads are sent to a representative's lead queue base on country and/or zip code of lead, and thus zip/country fields 510 provide room for such information. Queue field 511 and WIPbin field 512 provide subfolder 311 and 301 information, respectively. Rating field 515 comprises a pull down menu for selecting a rating for a registration or a quote. Ratings may be based on timing of a project and/or potential volume to be purchased. Accept button 518 is active prior to taking ownership of a lead. For example, by right-clicking on a lead with a cursor-pointing device thus invoking lead form screen image 500, accept button 518 will be shown as selectable, where ownership of such a lead may be taken by clicking on accept button 518. This is an alternative process to the above-described drag and drop method.

Create design registration button 513 and create quote button 514 allow a user to create registrations and quotes, respectively. If a lead has been accepted by a distributor, for example, and such lead results in a registration or a quote, the distributor opens an associated lead work object from WIPbin 301 shown in FIG. 3, and then clicks on create registration button 513 or create quote button 514, as applicable. By clicking on a button 513 or 514, a corresponding registration or quote form screen will appear. The distributor then completes such a form. Upon actuating either button 513 or 514, a lead source associated with such lead is stored in a database.

If a lead is found to be invalid, a user may select make invalid button 516. Changing status of a lead to invalid may be due to inability to make contact with a lead contact person, gain of such a sale would not justify the effort, among other reasons. A reason for invalidating a lead may be added to a notes section 533 under survey tab 506, as illustratively shown in FIG. 5C. Print lead button 517 allows a user to print information about a lead, and is especially useful when a sales representative wants to forward a lead to an outside sales representative, namely, a representative that does not have on-line access to SFA system 211.

Figure 5B:
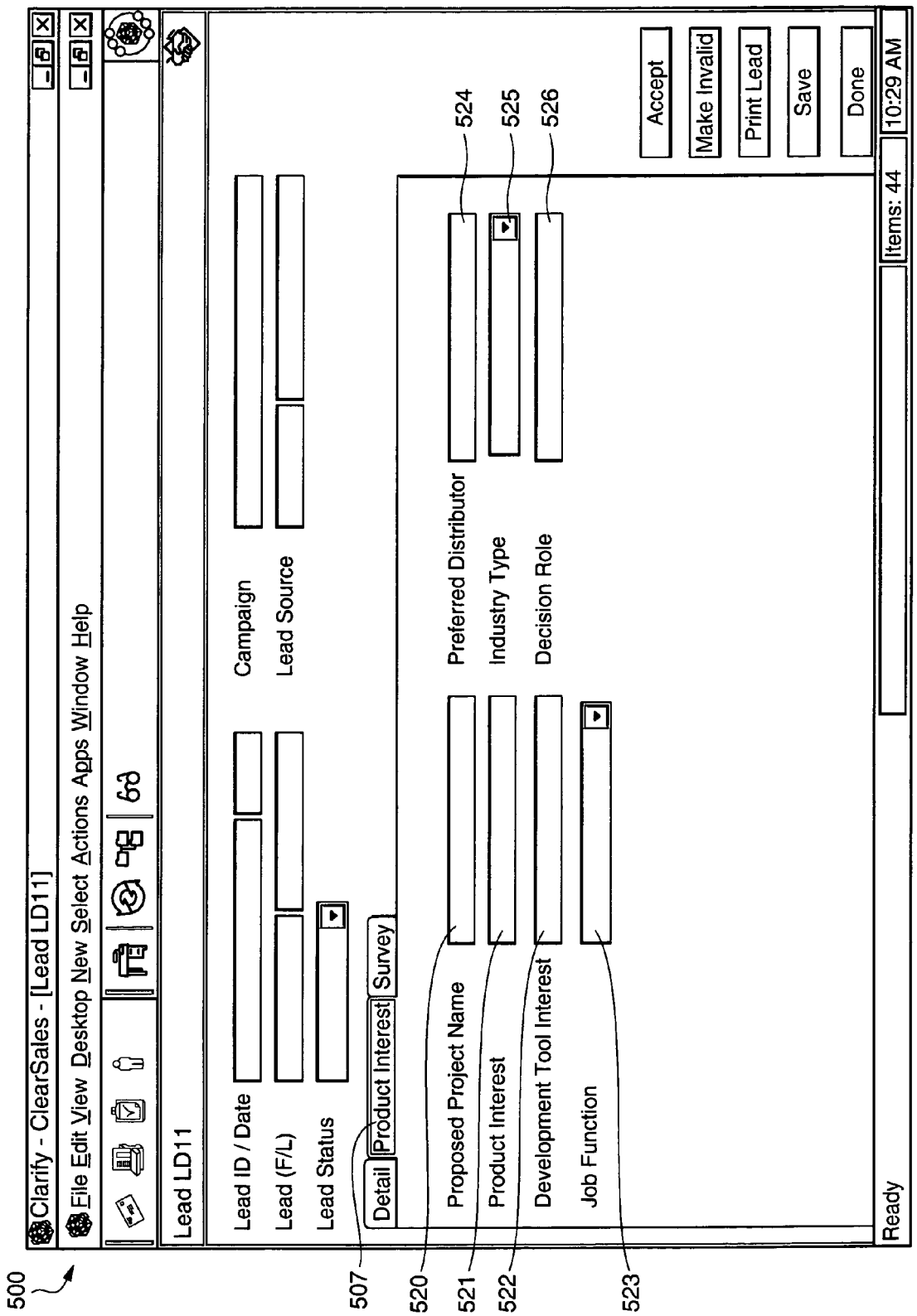
FIG. 5B is a screen image of an exemplary embodiment of a lead form screen image having product interest tab selected to provide a lead product interest view in accordance with an aspect of the present invention.

Referring to FIG. 5B, there is shown a screen image of an exemplary embodiment of lead form screen image 500 having product interest tab 507 selected to provide a lead product interest view in accordance with an aspect of the present invention. Product interest tab 507 comprises proposed project name field 520, product interest field 521, development tool interest field 522, job function field 523, preferred distributor field 524, industry type field 525 and decision role field 526. These fields may be used in part to record information about a potential customer's interest with respect to a lead.

Figure 5C:
FIG. 5C is a screen image of an exemplary embodiment of a lead form screen having survey tab selected to provide a lead survey view in accordance with an aspect of the present invention.

Referring to FIG. 5C, there is shown a screen image of an exemplary embodiment of lead form screen image 500 having survey tab 506 selected to provide a lead survey view in accordance with an aspect of the present invention. Survey tab 506 allows question identifications 530, survey questions 531 and survey responses 532 to be recorded for a particular customer associated with a lead.

Referring again to FIG. 5A, lead detail view comprises new opportunity button 540. If a representative selects new opportunity button 540, then lead status resulting in a design registration or quote is updated to "Attached-Primary" and is indicated in lead status field 408. Such a new opportunity is identified in opportunity fields 541 by name and number, and buttons 513, 514, 540 and 542 are de-activated. "Attached-Primary" means that a lead source that generated such a lead, resulting in a representative creating a new opportunity from such design registration or quote, gets credit for all sales associated to that opportunity. This facilitates marketing efforts for evaluation and comparison of effectiveness of marketing activities, namely, each lead source may be discretely associated with actual sales revenue generated from or in response to such lead source.

If, however, a lead work object is attached to an existing opportunity, then lead status resulting in a design registration or quote is updated to "Attached-Secondary" as indicated in field 408. "Attached-Secondary" means that a lead source that generated such a lead, resulting in a representative creating a design registration or quote for an existing opportunity, will not get credit for any sales associated to that opportunity. This too facilitates marketing efforts for evaluation and comparison of effectiveness of marking efforts, namely, which lead sources were not effective in generating new opportunity revenue. In sum, a lead that has Attached-Primary status has potential to generate new business, where a lead that has Attached-Secondary status does not.

A lead work object is attached to an existing opportunity by selecting checked button 542. In response to clicking button 542, a list of existing opportunities will appear. By selecting an existing opportunity from such list, the selected opportunity is attached to the lead work object. Lead status field 408 is updated to indicate Attached-Secondary; such an existing opportunity is identified in opportunity fields 541 by name and number; and buttons 513, 514, 540 and 542 are de-activated. Etcetera or " . . . " button 543 is a go to button for retrieving a record for a value entered in a go to button associated field, in this example information on a selected existing opportunity.

Figure 6:
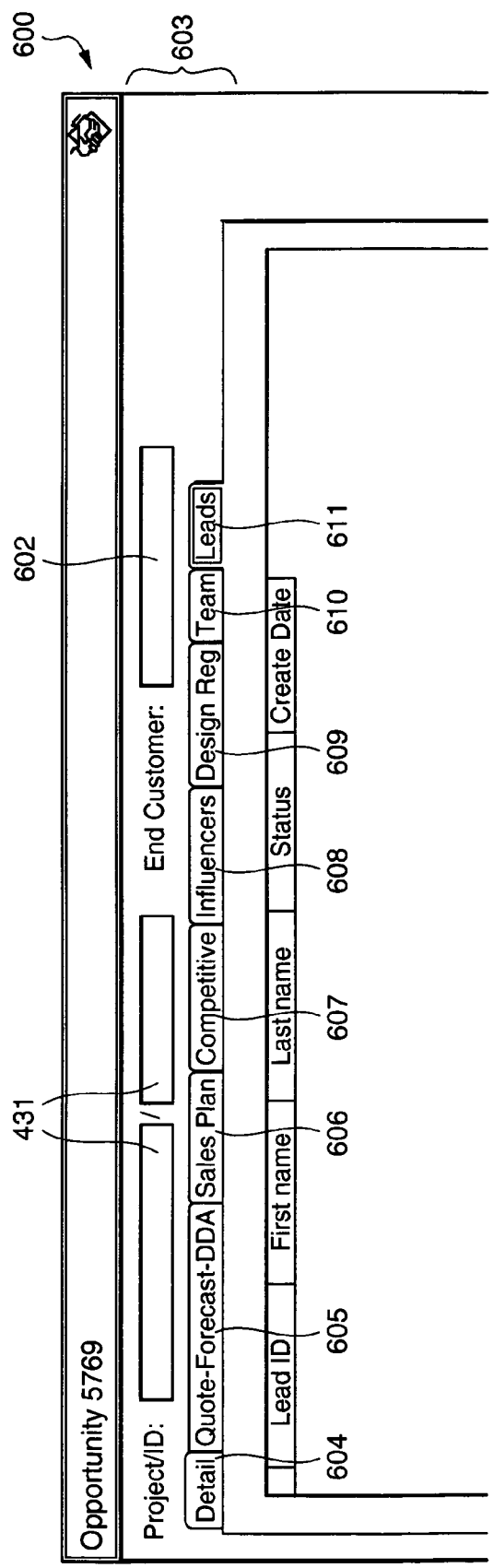
FIG. 6 is a portion of a screen image of an exemplary embodiment of an opportunity item form screen image in accordance with an aspect of the present invention.

Referring to FIG. 6, there is shown a portion of a screen image of an exemplary embodiment of an opportunity item GUI screen image 600 in accordance with an aspect of the present invention. Opportunity item GUI screen image 431 comprises project identification fields 601 and end customer field 602 in header section 603, as well as eight tabs, namely, detail tab 604, quote-forecast-DDA (Distributor Debt Authorization) tab 605, sales plan tab 606, competitive tab 607, influencers tab 608, design registration tab 609, team tab 610 and leads tab 611. Leads tab 611 is illustratively shown as having been activated or selected for providing information on a lead.

Figure 7:
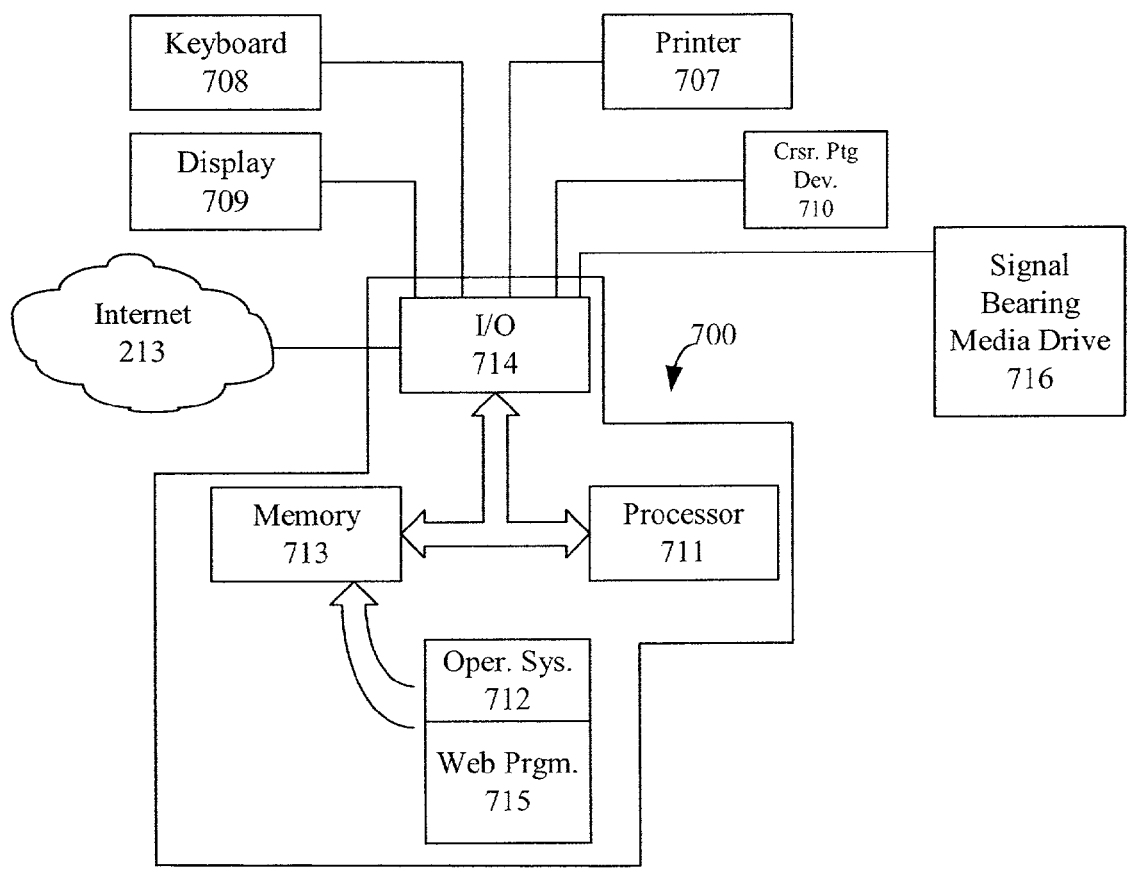
FIG. 7 is a block diagram of a computer system.

Referring to FIG. 7, there is shown a block diagram of a computer system 700. Computer system 700 may be implemented using a configured personal computer, workstation computer, mini computer, mainframe computer, or a distributed network of computers. Computer system 700 may be used for computers 209 or 210 shown in FIG. 2, where back office systems 208, SFA system 211, sales database 218, quality database 217 and support database 216 are stored in memory 713. Moreover, computer system(s) 700 may be located at ISOs, FSOs, regional offices, distributors, among other sales and marketing locations and the like. Computer system 700 is configured with at least one of the following: processor 711, input/output interface 714, and memory 713.

Computer system 700 comprises operating system 712, which may be OS/2, Java Virtual Machine, Linux, Solaris, Unix, Windows, Windows95, Windows98, Windows NT, Windows ME and Windows2000, among other known platforms, and comprises a Web-enabled program 715 such as Microsoft's Internet Explorer, Netscape Navigator or the like. Program 715 is may be a client or server version of such program depending on application. Operating system 712 and program 715 may be disposed in memory 713. Memory 713 may include one or more of the following random access memory, read only memory, magneto-resistive read/write memory, optical read/write memory, cache memory, magnetic read/write memory, among other signal/bearing media and the like.

For purposes of clarity, computer system 700 is described as though it is located at any ISO, FSO, regional office or distributor. Coupled to computer system 700 are printer 707, keyboard 708, signal bearing media drive 716, display screen 709 and cursor-pointing device 710. Though keyboard 708 is provided for data entry, keyboard 708 may be replace by a microphone and well-known voice activation software. Computer system 700 is coupled to the Internet or other network 213 for communicating as described elsewhere herein. Screen images mentioned-above may be displayed on display 709 and acted on using keyboard 708 or cursor-pointing device 710.

An aspect of the present invention is implemented as a program product for use with a computer system such as, computer system 700. The program(s) of the program product defines functions of the embodiments and can be contained on a variety of signal/bearing media, which include, but are not limited to: (i) information permanently stored on read only storage media (e.g., read-only memory devices within a computer such as CD-ROM disks readable by a CD-ROM drive); (ii) alterable information stored on non-read only storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Thus, leads in a particular territory may be gathered. It may be decided which leads relate to current opportunities and which ones have the potential to become or become new business. Leads are distributed and status of leads may be monitored to determine that they have been acted upon and have had status updates. Lead status is systematically updated based on how a lead is acted upon. Accordingly, various groups, such as corporate communications, sales management, marketing, product management and the like, are able to facilely determine what percentage of leads are being followed-up on by representatives, what percentage of leads result in business, among other statistical evaluations. Notably, users are required to enter little if any data. Notes to representatives or distributors may be added, but updating lead status involves selecting an appropriate button on a lead form screen image. Moreover, attachment of an opportunity can also cause updating of lead status.

In providing the above-described lead processing system, off-the-shelf programs were used. These programs include Clarify, ClearSales and ClearSupport from Clarify Software, Inc. of San Jose, Calif.; SQL Server from Sybase, Inc. of Emeryville, Calif.; and Oracle of the Oracle Corporation of Redwood City, Calif.

While foregoing is directed to the preferred embodiment of the present invention, other and further embodiments of the invention may be devised without departing from the basic scope thereof, and the scope thereof is determined by the claims that follow. All trademarks are the respective property of their owners.

The invention claimed is:

1. A computer-implemented method for processing a lead, wherein at least one step of the computer-implemented method is performed by a computer, the method comprising:
importing the lead into a sales force automation system in communication with a database, the lead being qualified by a lead qualification agency and rated by a rating entity prior to importation into the sales force automation system;
dispatching a lead task associated with the lead to a lead queue of a first representative organization, the first representative organization being an Independent Sales Organization separate from each of the lead qualification agency and the rating entity;
the first representative organization:
    retrieving lead information of the lead task;
    first searching for an existing opportunity associated with the lead information;
    prioritizing the lead;
    when the existing opportunity is not found, dispatching a lead action item form as an object to a second representative organization, the lead being prioritized by the first representative organization for the second representative organization, the second representative organization being a distributor separate from the Independent Sales Organization and separate from each of the lead qualification agency and the rating entity;
the second representative organization:
    determining whether the lead is valid;
    accessing a lead form associated with the lead action item form;
    updating the lead form regarding validity of the lead;
    when the lead results in a registration or a quote, creating a registration form or a quote form as an object from the lead form, the lead source being automatically stored in association with the object;
    submitting the registration form or the quote form to the first representative organization for approval;
the first representative organization:
    second searching for determining whether the existing opportunity was created by another lead associated with the lead source of the lead in a time frame between the first searching and the second searching for determining whether to credit the lead source regarding a sale resulting from the registration or the quote;

when the existing opportunity is found responsive to the second searching, attaching the registration form or the quote form to the existing opportunity;

when the existing opportunity is not found responsive to the second searching, creating a new opportunity from the registration form or the quote form;

updating lead status; and associating the lead status as undated to the existing opportunity or the new opportunity;

the lead source associated with the lead leading to the registration or the quote automatically being not credited with any sales associated with the registration or the quote responsive to the lead status being undated for the existing opportunity; and the lead source associated with the lead leading to the registration or the quote automatically being credited with any sales associated with the registration or the quote responsive to the lead status being updated for the new opportunity.

2. The computer-implemented method of claim 1 further comprising:

accepting the lead task into a work-in-process bin of the first representative organization;

accepting the lead action item form by the second representative organization;

providing the database with an action item table and lead tables;

loading follow-up information associated with the lead into the action item table; and loading data associated with the lead into the lead tables.

3. A computer-implemented method for processing a lead having lead data associated therewith between a first organization, a second organization and a third organization, wherein at least one step of the computer-implemented method is performed by a computer, the method comprising:

providing a lead action item form and a lead form;

obtaining the lead action item form and the lead form each of which is at least partially populated with the lead data, the lead having been qualified by a lead qualification agency and rated by a rating entity prior to importation into the lead action item form and the lead form;

assigning the lead action item form and the lead form to a lead queue of the first organization, the first organization being an Independent Sales Organization separate from each of the lead qualification agency and the rating entity;

the first organization:

retrieving lead data from the lead action item form;

first searching for an existing opportunity associated with the lead data;

when the existing opportunity is found,
attaching the lead to the existing opportunity using the lead action item form for the lead;
prioritizing the lead; and
dispatching by the first organization the lead action item form to the second organization, the lead being prioritized by the first organization for the second organization, the second organization being a distributor separate from the Independent Sales Organization and separate from each of the lead qualification agency and the rating entity;

when the existing opportunity is not found,
prioritizing the lead; and
dispatching by the first organization the lead action item form to a third organization, the lead being prioritized by the first organization for the third organization, the third organization being another distributor separate from each of the second organization, the Independent Sales Organization, the lead qualification agency, and the rating entity;

either the second organization or the third organization:
determining whether the lead is valid;
when the lead results in a registration or a quote, creating a registration form or a quote form as an object associated with the lead; and
submitting the registration form or the quote form to the first representative organization for approval;

the first representative organization:
second searching for the existing opportunity associated with the lead data, the second searching for determining whether the existing opportunity was created by another lead associated with a lead source of the lead in a time frame between the first searching and the second searching for determining whether to credit the lead source regarding a sale resulting from the registration or the quote;
when the existing opportunity is not found, creating a new opportunity from the registration form or the quote form, which in turn populates a lead source database with the lead source;
when the existing opportunity is found, attaching the registration form or the quote form to the existing opportunity;
updating lead status;
associating the lead status as updated to the new opportunity or the existing opportunity; and
determining revenue generated in association with the lead source resulting from the new opportunity to ascertain the effectiveness of the lead source;

the lead source associated with the lead leading to the registration or the quote being automatically credited with all sales associated with the registration or the quote responsive to the lead status being undated for the new opportunity; and the lead source associated with the lead leading to the registration or the quote being automatically not credited with any sales associated with the registration or the quote responsive to the lead status being updated for the existing opportunity.

4. The computer-implemented method of claim 3 further comprising associating the lead with a campaign.

5. The computer-implemented method of claim 3 wherein the rating entity is a hiring entity that hires each of the third organization, the second organization, the Independent Sales Organization, and the lead qualification agency.

6. The computer-implemented method of claim 3 wherein the lead queue is a folder object.

7. A computer-implemented method for processing a pre-qualified and rated lead having a lead source, wherein at least one step of the computer-implemented method is performed by a computer, the method comprising:

importing the lead into a sales force automation system in communication with a database, the lead being qualified by a lead qualification agency and rated by a rating entity prior to importation into the sales force automation system;

dispatching a lead action item object with the lead data and the task information to a lead queue of a first representative organization, the first representative organization being an Independent Sales Organization separate from each of the lead qualification agency and the rating entity;

the first representative organization:

retrieving the lead data from the lead action item object;

first searching for an existing opportunity associated with the lead data;

attaching the lead to the existing opportunity found by associating the lead action item object with the existing opportunity; and sending the lead action item object to a second representative organization, the lead being prioritized by the first representative organization for the second representative organization, second representative organization being a distributor separate from the Independent Sales Organization and separate from each of the lead qualification agency and the rating entity;

the second representative organization:
  determining whether the lead is valid;
  accessing a lead form associated with the lead action item form;
  updating the lead form regarding validity of the lead;
  when the lead is valid and results in a registration or a quote, creating a registration form or a quote form from the lead form as an object;
  submitting the registration form or the quote form to the first representative organization for approval;

the first representative organization:
  second searching for determining whether the existing opportunity was created by another lead associated with a lead source of the lead in a time frame between the first searching and the second searching for determining whether to credit the lead source regarding a sale resulting from the registration or the quote;
  when the existing opportunity is found responsive to the second searching, attaching the registration form or the quote form to the existing opportunity;
  when the existing opportunity is not found responsive to the second searching, creating a new opportunity from the registration form or the quote form;
  updating lead status; and
  associating the lead status as updated to the existing opportunity or the new opportunity;

wherein when the registration or the quote is for the new opportunity, the lead status is set as Attached-Primary and the lead source associated with the lead leading to the registration or the quote is automatically credited with all sales associated with the registration or the quote; and wherein when the registration or the quote is for the existing opportunity, the lead status is set as Attached-Secondary and the lead source associated with the lead leading to the registration or the quote is not credited with any sales associated with the registration or the quote.

8. The computer-implemented method of claim 7 further comprising:

accepting the lead action item form by the second representative organization;

providing the database with an action item table and lead tables;

loading follow-up information associated with the lead into the action item table; and loading data associated with the lead into the lead tables.

* * * * *